United States Patent [19]

Briccetti

[11] 4,448,033

[45] May 15, 1984

[54] THERMOSTAT SELF-TEST APPARATUS AND METHOD

[75] Inventor: Mario F. Briccetti, Liverpool, N.Y.

[73] Assignee: Carrier Corporation, Syracuse, N.Y.

[21] Appl. No.: 362,786

[22] Filed: Mar. 29, 1982

[51] Int. Cl.³ .................... F25B 49/00; G05D 23/00
[52] U.S. Cl. ..................................... 62/126; 236/94; 364/186; 371/57
[58] Field of Search ............... 62/125, 126, 127, 129, 62/130; 236/94; 165/11 R; 364/184, 185, 186, 557; 371/57, 25, 26

[56] References Cited

U.S. PATENT DOCUMENTS 4,307,775  12/1981  Saunders et al. ............ 165/12
4,333,316   6/1982  Stamp, Jr. et al. ........... 62/126
4,381,549   4/1983  Stamp, Jr. et al. ........... 364/551

Primary Examiner—Henry C. Yuen
Assistant Examiner—Harry Tanner
Attorney, Agent, or Firm—Robert P. Hayter

[57] ABSTRACT

Apparatus and method for effecting self-test of a thermostat is disclosed. The permissible thermostat outputs are arranged into an array capable of being converted into a binary number. Testing is done to determine whether or not the binary number ascertained falls into a known legal array of binary numbers for permissible thermostat outputs. If the testing indicates a fault condition then the fault is indicated and operation may be discontinued.

10 Claims, 6 Drawing Figures

THERMOSTAT SELF-TEST APPARATUS AND METHOD

BACKGROUND OF THE INVENTION

1. Field of the Invention

The present invention relates to a thermostat for use with a space conditioning system. More specifically, this invention concerns a control for energizing the space conditioning system in response to the thermostat and means for determining if the thermostat is appropriately functioning and/or appropriately wired to the control.

2. Description of the Prior Art

Air conditioners including units for supplying only cooling as well as heat pumps which supply heating and cooling, furnaces, electric resistance heaters and other space conditioning devices for heating and cooling, ventilating, humidifying and dehumidifying air are often controlled by a thermostat. Typically, the thermostat has a series of thermal sensing elements connected to ascertain the temperature of the space to be conditioned and to generate a signal upon a variance from a desired temperature being detected.

The thermostat is typically located in a centralized area of the space to be conditioned to detect the temperature at that location. Control wiring extends from the thermostat to the space conditioning unit. This control wiring is usually field installed and as a result thereof is subject to installer error in making the appropriate connections. Problems that can occur include the control wires being connected to the wrong thermostat terminals as well as a malfunction within the thermostat itself.

Damage to the space conditioning system may occur as a result of a malfunction or a miswired thermostat. Additionally, the space conditioning system may be unable to function to provide heating or cooling as a result of miswiring the connections to the thermostat. In either event, the occupant of the space to be conditioned is subject to discomfort as a result of the failure of the air conditioning system to properly operate.

SUMMARY OF THE INVENTION

It is an object of the present invention to provide a control for an air conditioning system which self-tests the thermostat.

It is a further object of the present invention to provide a method of determining whether or not the thermostat of the space conditioning system is operating properly and whether or not the field control wiring is installed properly between the thermostat and the main control.

It is a further object of the present invention to provide a microprocessor control means for self-testing a thermostat of a space conditioning system.

It is another object of the present invention to provide a safe, economical, reliable and easy to install method for verifying the appropriate thermostat operation of a space conditioning system.

These and other objects of the present invention are achieved according to the preferred embodiment by providing an apparatus and method wherein a fault in the wiring of a thermostat of an air conditioning system may be detected. The thermostat has a series of outputs which are energized under the appropriate conditions in known patterns to effect operation of the air conditioning system. First it is determined which outputs of the thermostat are energized and the status of these outputs is ascertained by comparing the outputs to a known pattern of legal or permissible thermostat outputs. A fault condition is indicated when the step of comparing determines that the outputs detected are other than those of a known legal pattern. The fault may be indicated by periodically energizing a thermostat signal light and by de-energizing the compressor of the refrigeration circuit. The logic involved to compare known legal or permissible outputs to the outputs actually sensed may be accomplished via a programmed microprocessor.

BRIEF DESCRIPTION OF THE DRAWINGS

FIG. 5 is a schematic wiring representation of a thermostat as may be used with the microprocessor control set forth herein.

FIG. 6 is a graph of the permissible thermostat outputs of the thermostat of FIG. 5.

DESCRIPTION OF THE PREFERRED EMBODIMENT

The apparatus as described will refer to a heat pump system for use in a residential building incorporating a microprocessor control.

It is to be understood that although the present method of operation and apparatus are accomplished utilizing a microprocessor control, the same functions may be accomplished by a mechanical or electromechanical means as well as manually. The utilization of the microprocessor control herein serves many functions in addition to the thermostat self-test function as set forth. It is further to be understood that although the present disclosure refers to a heat pump system the utilization of this thermostat self-test control may be applied to a straight cooling system, a furnace, humidifier or any other space conditioning system wherein it is deemed advisable to assure appropriate wiring operation of thermal sensing elements such as the thermostat.

Figure 1:
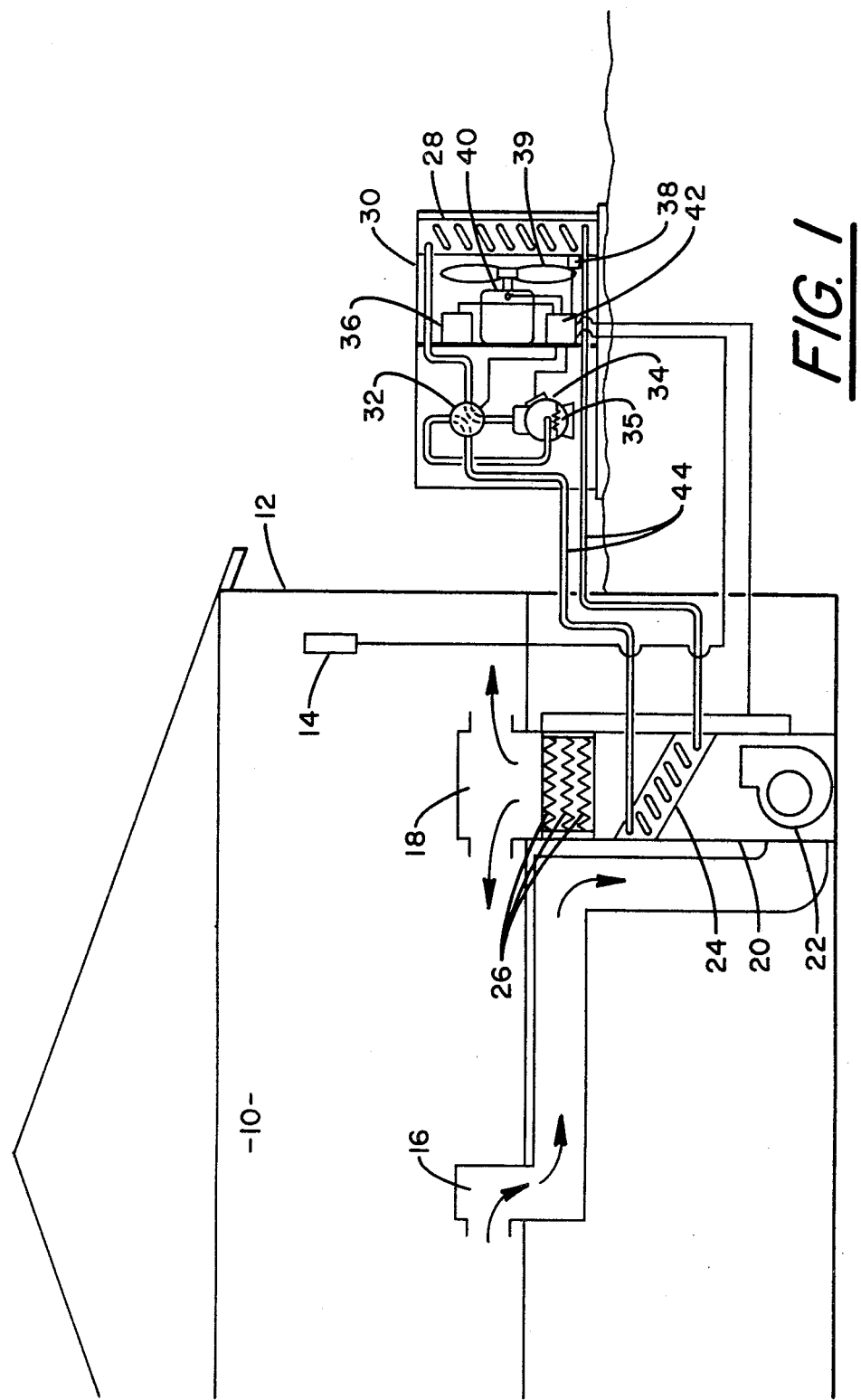
FIG. 1 is a schematic representation of a split heat pump system incorporated into a residential building.

Referring first to FIG. 1 there can be seen a schematic representation of a heat pump system. Residence 10 is shown having fan coil unit 20 located therein for circulating conditioned air within the house. Supply air duct 16 is shown directing air from the enclosure to fan coil unit 20 and return air duct 18 is shown for directing air from the fan coil unit back to the enclosure. Within the fan coil unit 20 may be seen indoor fan 22, indoor heat exchanger 24 and strip heaters 26. Indoor fan 22 acts to circulate the air through the supply duct, through the indoor heat exchanger and strip heaters and back through the return air duct to the enclosure. Indoor heat exchanger 24 is part of a refrigeration circuit and acts to either discharge heat to the air stream directed thereover via indoor fan 22 or to absorb heat energy therefrom. Strip heaters 26 are located downstream from indoor heat exchanger 24 and may be selectively energized to supply heat energy to the air stream flowing through the fan coil unit.

Outdoor unit 30 is shown located exterior of residence 10 and is typically mounted on a pad located adjacent thereto. Within outdoor unit 30 may be seen outdoor coil 28 of the refrigeration circuit, compressor 34 and reversing valve 32. Additionally, there can be seen outdoor fan 39 connected to outdoor fan motor 40 for circulating ambient air over outdoor coil 28. Outdoor temperature sensor 36, outdoor coil temperature senser 38, crankcase heater 35 and control 42 are also indicated to be within the outdoor unit. Likewise, thermostat 14 as well as electrical connections to strip heaters and the indoor fan motor for powering indoor fan 22 are designated.

The refrigeration circuit is made up of indoor coil 24, outdoor coil 28, compressor 34, reversing valve 32 and interconnecting piping 44. Expansion devices for accomplishing pressure drops between components of the refrigeration circuit are not shown.

During operation of this unit in the heating season, heat energy is absorbed in the outdoor coil 28 acting as an evaporator and discharged to indoor air via indoor heat exchanger 24 serving as a condenser. In the cooling mode of operation the reversing valve is switched such that hot gaseous refrigerant from the compressor is directed first to the outdoor coil 28 serving as a condenser and then directed to the indoor coil 24 serving as an evaporator for absorbing heat energy from the indoor air.

Figure 2:
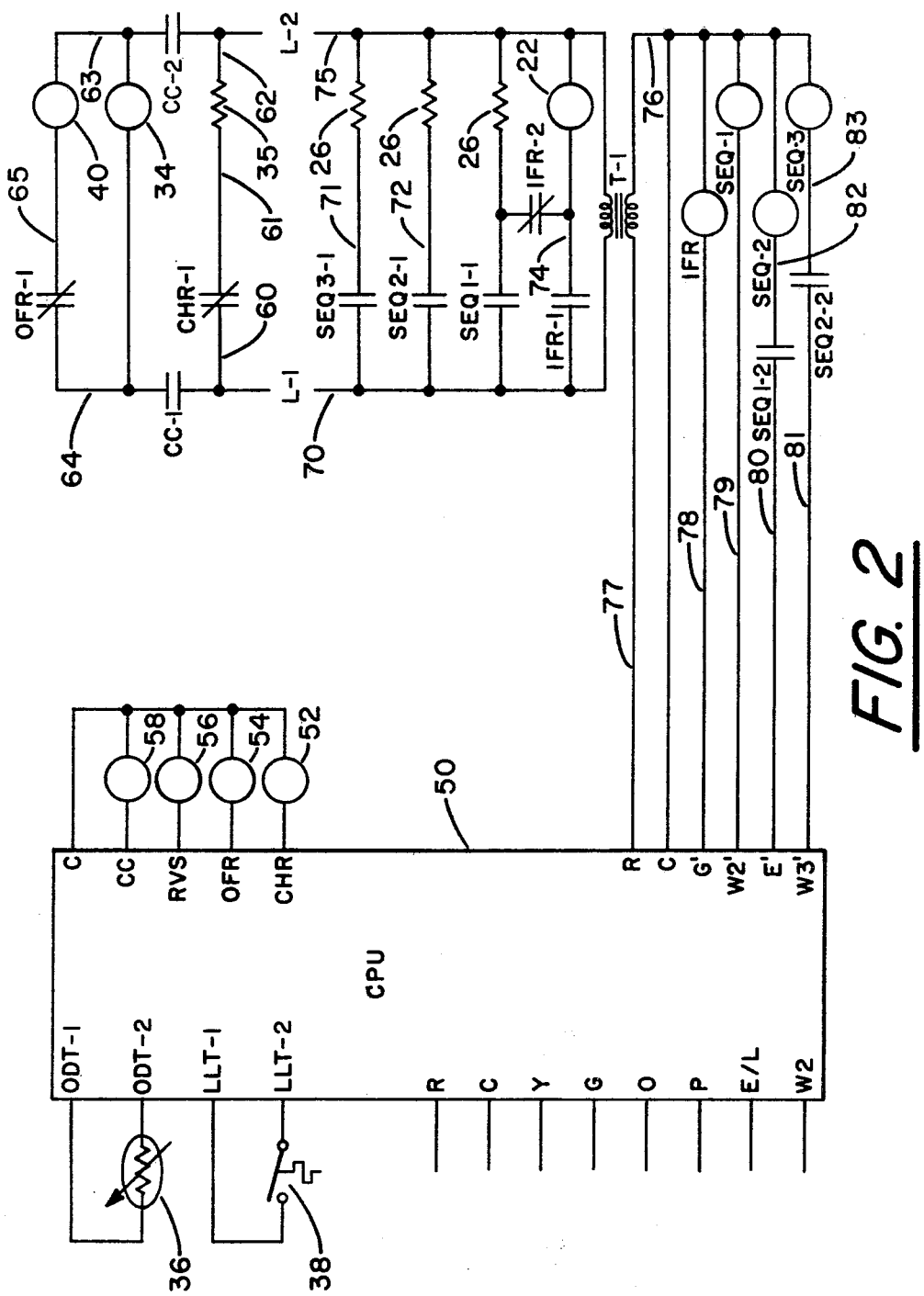
FIG. 2 is a schematic wiring diagram of the controls of the heat pump system.

Referring now to FIG. 2, there can be seen a schematic representation of the control system of this unit. In the left hand portion of FIG. 2 is shown, greatly enlarged, a central processing unit 50. Typically, this would be a commercially available microprocessor such as a Mostek 3870. It can be seen that the microprocessor has a plurality of inputs and outputs. Starting from the top left it can be seen that outdoor air temperature sensor 36 is connected through ODT-1 and ODT-2 to the central processing unit. Additionally, outdoor coil temperature sensor 38 is shown connected to the CPU through LLT-1 and LLT-2. Thereafter, a series of eight thermostat inputs labeled R, C, Y, G, O, P, E/L and W-2 are shown entering the central processor unit. In sequential order, these thermostat inputs are as follows: R—Power to the thermostat from the CPU; C—Common; Y—First stage heating; G—Energize indoor fan relay; O—First stage cooling (reversing valve); P—Power to the central processing unit from the thermostat; E/L—Emergency heat or fault light; W-2—Second stage heat.

On the right hand side of the central processing unit there may be seen connections to various relays. Crankcase heater relay 52, outdoor fan relay 54, reversing valve solenoid relay 56 and compressor contactor 58 are all shown connected to the appropriate compressor, reversing valve solenoid, outdoor fan relay, and crankcase heater relay connections of CPU 50. The CPU is programmed such that upon an appropriate set of inputs being sensed these relays will be energized.

At the bottom right hand side of the central processing unit 50 there are shown six connection points labeled respectively R, C, G', W-2', E' and W-3'. In order, these connections are R—Power, C—Common, G'—Indoor fan relay, W-2'—First stage heat, E'—Second stage heat and W-3'—Third stage heat. As can be seen in FIG. 2, the R connection is connected via wire 77 to one side of transformer T-1. The C connection is connected via wire 76 to the other side of transformer T-1. G' is connected via wire 78 to indoor fan relay IFR. Wire 79 connects W-2' to sequence relay SEQ-1. The E' terminal is connected via wire 80 to first sequence relay contacts SEQ1-2 which are connected by wire 82 to second sequence relay SEQ-2. Contact W-3' is connected via wire 81 to second sequence relay contacts SEQ2-2 which are connected by wire 83 to third sequence relay SEQ-3.

As shown in FIG. 2, lines L-1 and L-2 supply power to the fan coil unit and CPU. Line L-1, designated wire 70, is connected to normally open first sequence relay contacts SEQ1-1, normally open second sequence relay contacts SEQ2-1, to normally open third sequence relay contacts SEQ3-1, to normally open indoor fan relay contacts IFR-1 and to transformer T-1. Line L-2, designated as 75, is connected to heaters H1, H2 and H3, all designated as 26, to transformer T-1 and to indoor fan motor 22. Wire 71 connects normally open third sequence relay contacts SEQ3-1 to heater H3. Wire 72 connects normally open second sequence relay contacts SEQ2-1 to heater H2. Wire 73 connects normally open first sequence relay contacts SEQ1-1 to heater H1 and to normally closed indoor fan relay contacts IFR-2. Wire 74 connects normally open indoor fan relay contacts IFR-1 and normally closed indoor fan relay contacts IFR-2 to indoor fan motor 22.

Power wiring of the outdoor unit may be seen in the top portion of FIG. 2. Therein connected between power lines L-1 and L-2 is wire 60 connected to normally open compressor contacts CC-1 and to normally closed crankcase heater relay contacts CHR-1. Wire 61 connects normally closed crankcase heater relay contacts CHR-1 with crankcase heater CCH (35). Crankcase heater 35 is connected via wire 62 to line L-2 and to normally open compressor contactor contacts CC-2. Wire 64 connects normally open compressor contactor contacts CC-1 to normally closed outdoor fan relay contacts OFR-1 and to compressor motor 34. Wire 65 connects normally closed outdoor fan relay contacts OFR-1 to outdoor fan motor 40. Normally open compressor contactor contacts CC-2 are connected via wire 63 to compressor motor 34 and to outdoor fan motor 40.

Figure 3:
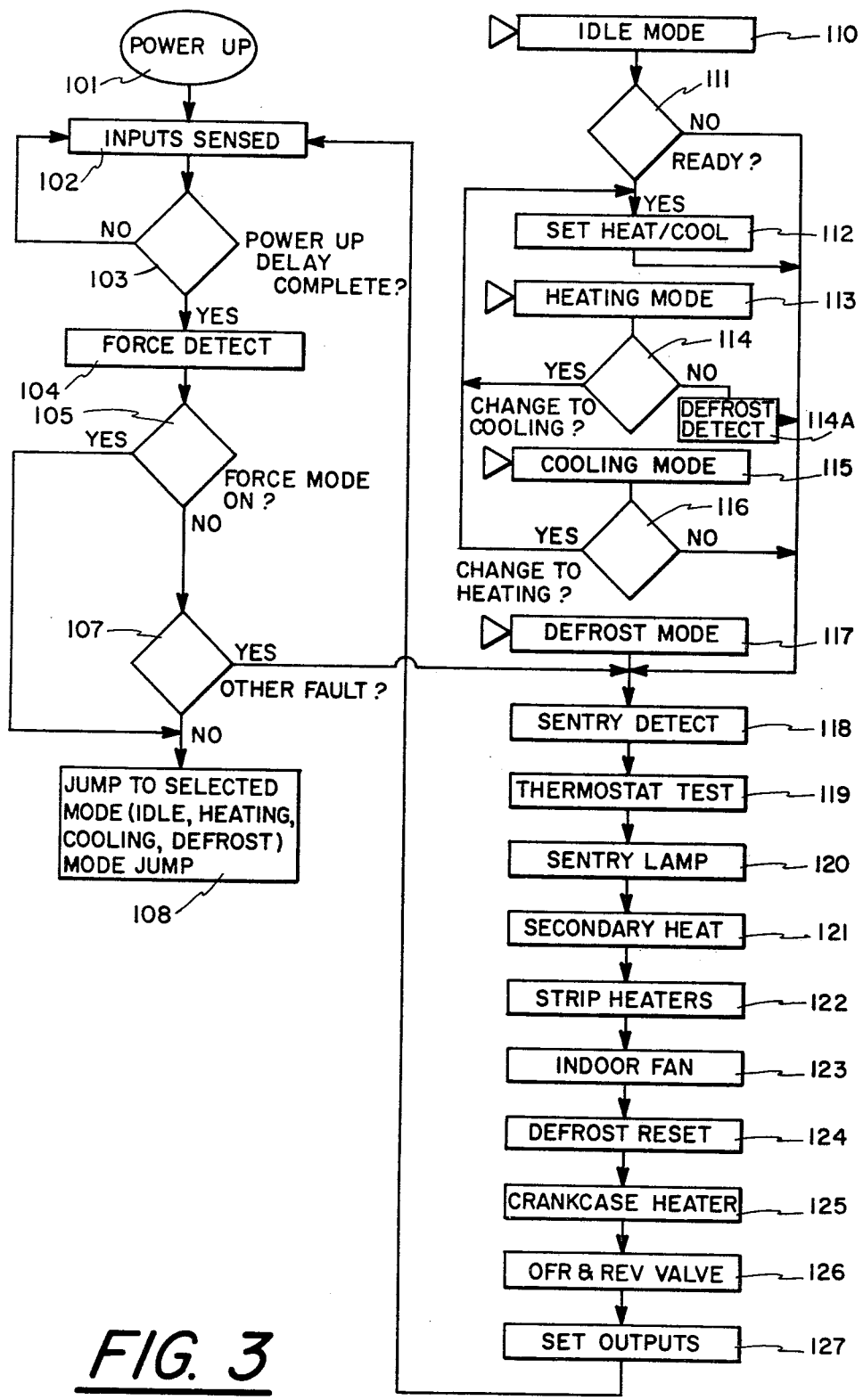
FIG. 3 is a flow diagram of the summary of operation of a microprocessor control for the heat pump system.

FIG. 3 is a flow chart indicating the overall operation of the control system. It can be seen that the overall system control is obtained by logic flow through a series of logic steps. Each logic step may represent a subroutine or series of steps omitted for clarity in this overall chart. The initial step 101 is the powerup of the unit upon energization. Thereafter at step 102 the various inputs are sensed. To make sure the inputs are stabilized and debounced a powerup delay occurs before proceeding to force detect step 104. If the powerup delay is not complete then there is a reversion to the step of sensing inputs until said delay is accomplished. Force detect, step 104, determines whether or not the compressor is operating when it is not supposed to be. This step would detect a condition such as a contactor welded closed energizing the compressor when the various inputs are calling for the compressor to be deenergized. Step 105 determines whether the force mode is detected. If the force mode is detected then the program skips to step 108 wherein the logic jumps to the selected mode. If, in step 105, the force mode is not detected then the logic proceeds to step 107. At step 107 there is a determination whether there is another fault in the system. If there is no other fault the logic proceeds to step 108, the jump to the selected mode, one of the modes of idle, heating, cooling or defrost. If another fault is detected then the control logic jumps to step 118, sentry detect.

If in step 108 the jump is selected to the idle mode then the logic proceeds to step 110. Thereafter, at step 111, a ready determination is made and if the answer is no the logic jumps to step 118 without placing the unit in heating or cooling. If the answer to step 111 is yes the logic proceeds to step 112 and the air conditioning unit is placed in heating or cooling in step 112. The logic then jumps to step 118.

If the jump to the selected mode selects the heating mode then the jump is made to step 113. Once operation is in the heating mode the question of should operation be changed to cooling is continually answered at step 114. If the answer is yes, the logic is cycled back to step 112 of setting the unit in heat or cool and if the answer is no logic operation proceeds to step 114A, defrost detect. If a need for defrost is detected the logic changes the mode from heating to defrost and then jumps to step 118. If a need for defrost is not detected the logic does not change the mode and then jumps to step 118.

If in step 108 the selection is the cooling mode then the logic proceeds to step 115. Step 116 continually questions if operation should be changed to heating. If the answer is yes the control sequence proceeds back to the step 112 of setting the unit for heating or cooling. If the answer is no the logic jumps to step 118.

The fourth mode jump is to the defrost mode, step 117. This step in the logic either continues or cancels the defrost mode of operation. If the jump is made to the defrost mode, thereafter the logic proceeds through the entire control sequence. From the defrost mode the control sequence includes the steps of sentry detect 118, thermostat test 119, sentry lamp 120, secondary heat 121, strip heaters 122, indoor fan 123, defrost reset 124, crankcase heater 125, OFR plus REV valve 126 and set outputs 127. From the step of set outputs 127 the control sequence reverts to step of inputs sensed (102).

The sentry detect step acts to check the compressor for low current or for ground fault indication. The thermostat test checks to make sure the inputs from the thermostat are in a legal pattern. The sentry lamp step acts to blink a thermostat lamp to indicate various fault modes. Secondary heat controls the W-2 output from the central process unit. The step of strip heaters 122 control the E' and W-3' outputs from the central processing unit. Indoor fan step 123 controls indoor fan 22. Defrost reset determines when a defrost timer for controlling the length of defrost needs to be reinitialized. Crankcase heater, step 125, acts to control the crankcase heater operation. OFR plus REV valve, step 126, acts to control the outdoor fan relay and the reversing valve relays under the appropriate conditions. Step 127 for setting the outputs turns on and off the central processing unit outputs and detects when the compressor is changing state.

Figure 4:
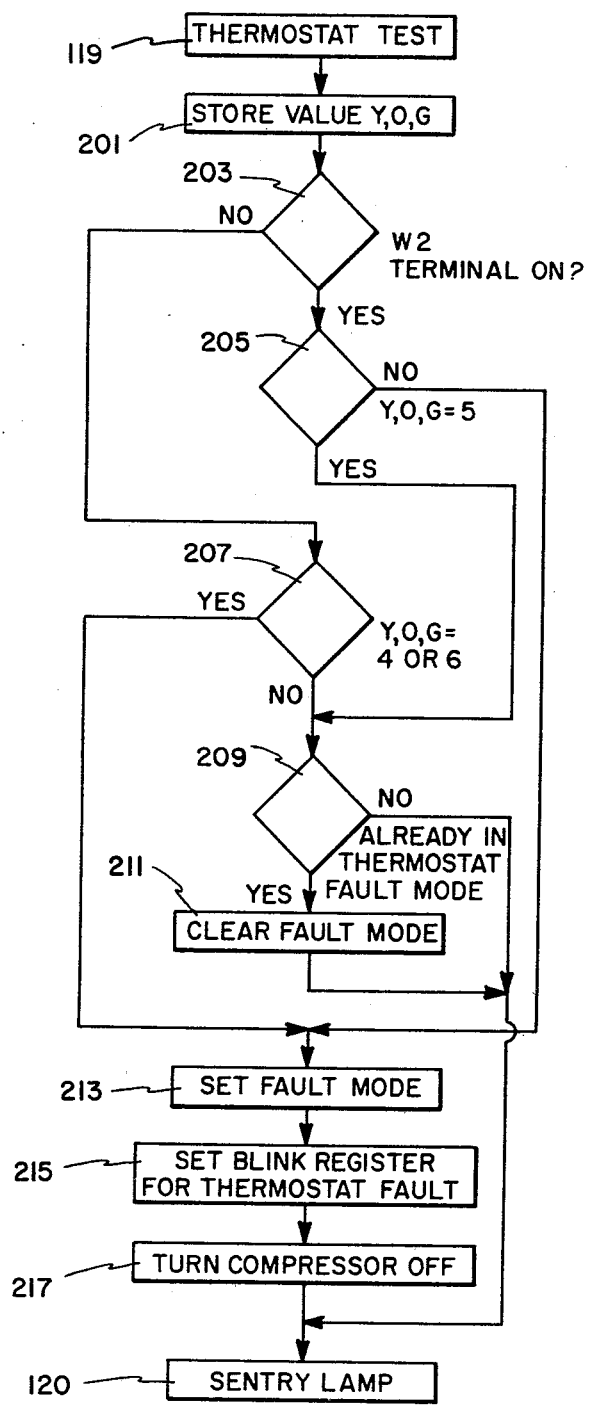
FIG. 4 is a flow diagram of the thermostat self-testing function of the microprocessor control.

Referring now to FIG. 4 there can be a logic flow chart for the self-test portion of the control logic. Thermostat test step 119 and sentry lamp step 120, are both shown in FIG. 3 as part of the overall operation of the microprocessor control. Therebetween it can be seen at step 201 the value of the Y, O and G terminals of the thermostat is stored. This refers to the value being stored as either a 1 or 0 indicating by a 1 that the terminal is energized and by a 0 that the terminal is de-energized. At step 203 the question is then asked whether or not the W-2 terminal is on. If the answer is yes, the logic flows to step 205 to then ask the question whether the representation of Y, O, G equals 5. This question is asking whether or not the binary representation of the Y, O, G terminals equals 5 or in other words whether or not the Y terminal is energized, the O terminal is not energized and the G terminal is energized. Hence, the binary number 101 representing 5 would be the value stored in step 201. If the answer is no the logic proceeds to step 213 to set the fault mode. If the answer is yes the logic then proceeds to step 209 wherein it is questioned whether or not the thermostat is already in the fault mode. If the answer is no in step 209 the logic flows on to step 120, sentry lamp. If the answer is yes that the thermostat is already in the fault mode at step 209, the logic then flows to step 211 to clear the fault mode before proceeding to step 120, sentry lamp.

If at step 203 the W-2 terminal is not on indicating that secondary heat is not being called for the logic then flows to step 207. At step 207 the question is then asked whether the stored value of Y, O, G in sequence equals 4 or 6. Again, it is the binary representation of 4 or 6 which is tested for such that the binary numbers 100 or 110 would be the appropriate solutions to get a yes answer. Any other representation is a no answer. In other words, if the Y terminal calling for compressor operation and the O terminal is calling for cooling operation both are energized and the legally unacceptable numeral representation 110 is generated if the G terminal is not energized. Also, if the Y terminal is energized and neither the O terminal nor the G terminal are energized then the legally unacceptable answer of 100 is detected and the logic proceeds to step 213 to set the fault mode. If, at step 207, it is determined that the binary number generated by the Y, O, G representation is not 4 or 6 then the logic proceeds to step 209. Again, at step 209 it is determined whether or not the logic is already in the thermostat fault mode. If the answer is no the logic proceeds to sentry lamp 120. If the answer to this question is yes the logic then flows to step 211 to clear the fault mode before flowing to sentry lamp step 120.

At step 213 the unit is set in the fault mode as a result of either a yes answer to step 207 or a no answer to step 205. From step 213 after the unit is set in the fault mode the logic advances to step 215 to set the blink register for the thermostat fault. The logic then flows to step 217 to turn the compressor off and then to sentry lamp step 120. The purpose of step 215 is to indicate to the blink register that a thermostat fault has been detected. The blink register then acts to energize a light in the thermostat such that the light blinks in a predetermined pattern indicating a thermostat fault.

FIG. 5 discloses a typical thermostat as might be utilized with the herein invention. The thermostat 14 is shown having a fan switch 501 having on and automatic positions. System switch 503 is shown with automatic, off and supplemental heat positions. Four thermal sensing elements are shown. First stage heating mode 510 and second stage heating mode 512 referenced respectively H-1 and H-2 are shown for indicating the staged heating requirements. First stage cooling bulb 514 and second stage cooling bulb 516 also indicated as $C_0$ and $C_1$ respectively are shown for detecting successive steps for cooling operation. Additionally, terminal strip 510 is shown having appropriate terminal connections G, Y, W-2, O, P, C, E, L and R. These terminals of terminal strip 530 are connected via control wiring to the central processing unit as shown in FIG. 2. The terminals with corresponding letter designations in strip 530 are wired to the appropriate designated terminals of the central processing unit.

During operation power is supplied from terminal R to the system switch 503 and to fan switch 501. If the fan switch 501 is in the on position, power as supplied through terminal R is connected to terminal G for operating the fan. If the fan is in the automatic position the fan terminal G is only powered when a heating or cooling need is sensed. Power from terminal R is supplied through system switch 503 to terminal P which acts to power the central processing unit. Power is also supplied through the system switch in the automatic position to first stage cooling bulb 514 and to first stage heating bulb 510. Upon first stage heating bulb 510 sensing a need for heating the bulb rotates and contact is made such that power from terminal R is then connected through the first stage heating bulb 510 to fan switch 501 for energizing the fan and to terminal Y for energizing the compressor. At this point power is also supplied through system switch 503 to second stage heating bulb 512. When second stage heating bulb 512 closes then power is supplied to terminal W-2 in addition to terminal Y.

Should a cooling need be sensed then power is supplied from terminal R through system switch 503 to first stage cooling bulb 514. Should the first stage cooling bulb be in a position to make contact power is then supplied to terminal O which is connected to energize the reversing valve to the cooling position. Upon a further rise in temperature bulb C-1 closes supplying power to the Y terminal, said power being received through the first stage cooling bulb 514.

Terminal C is a common terminal of the power supply system. Terminal E is energized directly through system switch 503 and bulb 510 when the system switch is in the supplemental heating position. Terminal L is jumpered to terminal E and has light 520 connected between terminal L and C such that upon application of power therethrough the light may be blinked. Upon the present apparatus detecting a fault in the wiring of the thermostat this light is blinked to indicate to the observer that this problem exists.

FIG. 6 is a graph representation of the various legal or permissible thermostat outputs. As indicated thereon, reference numeral 1 indicates that the output is energized and reference numeral 0 indicates that it is de-energized. A total of seven permissible states are indicated. Column rows A, B, C, D, E, F and H indicate permissible modes of operation respectively cooling compressor, fan only, second stage heating, heating compressor only, off, reversing valve only and fan and reversing valve only. Rows labeled Y, O, G, and W-2 indicate the appropriate state of each of these outputs in the appropriate modes. Hence, it may be seen that row A indicates the cooling compressor mode of operation and that terminals Y, O, G should be energized and W-2 should not be energized. It may also be seen in FIG. 6 that the only appropriate set of conditions wherein a second stage heating need is indicated is when W-2 is energized. In all other operating modes of operation terminal W-2 is not energized. In the other various modes of operation it can be seen that certain permissible thermostat terminal states may occur.

Comparing now the flow chart of FIG. 4 with the permissible outputs of FIG. 6 it is seen that testing is done at step 203 to determine whether or not the W-2 terminal is on the equivalent of whether or not the row C or second stage heating condition is present. If the answer to step 203 is yes indicating that the W-2 terminal is energized and then it is apparent that the only permissible state for the remaining terminals is for the Y terminal to be energized, the O terminal not to be energized and the G terminal to be energized. These three numerals in the order as presented are binary representation of number 5. Hence, if the stored value of these three terminals is other than 5 then a fault condition exists. If the number is 5 then it is an indication that a fault condition does not exist.

If testing for W-2 terminal energization shows that the W-2 terminal is not energized then this only indicates that the unit is not in row C mode of operation. It can then be seen that the remainder of the terminal conditions are such that the binary representations are other than 4 or 6. For instance, the binary representation in row A is 7, row B is 1, row D is 5, row E is 0, row F is 2 and row H is 3. Hence, if it is determined that the binary representation of the states of these three outputs is 4 or 6 then the thermostat is in the fault condition. If it is determined that this representation is other than 4 or 6 then it is assumed that the thermostat is not in a fault condition. It is this question which is asked at step 207 in the flow chart of FIG. 4.

It is to be understood from the above description that as disclosed herein a microprocessor control is utilized to detect fault conditions in the thermostat. The fault conditions detected are both improper wiring of the thermostat and a fault in the thermostat generating an improper set of outputs. These faults are detected by the inputs sensed to the microprocessor. As used herein the terms thermostat outputs are assumed to be the same as the microprocessor inputs. A wiring error may show up therebetween since the terminology as used herein is meant to incorporate the same.

The herein invention has been described with reference to a specific embodiment. It is to be understood by those skilled in the art that variations and modifications can be effected within the spirit and scope of the invention.

What is claimed is:

1. A method of detecting a fault in the wiring of a thermostat of an air conditioning system wherein the thermostat has a series of outputs which are energized under the appropriate conditions in known patterns to effect operation of the air conditioning system which comprises the steps of:
   determining which outputs of the thermostat are energized;
   comparing the status of the outputs ascertained by the step of determining with the known pattern of legal thermostat outputs; and
   indicating a fault condition when the step of comparing detects that the outputs ascertained by the step of determining are other than a known pattern.

2. The method as set forth in claim 1 wherein the thermostat includes a light and wherein the step of indicating includes:
   periodically energizing the thermostat light to create a blinking pattern to signify the detection of a fault condition.

3. The method as set forth in claim 1 wherein the air conditioning system includes a refrigeration circuit having a compressor, condenser and evaporator and wherein the step of indicating includes de-energizing the compressor of the refrigeration circuit upon a fault being detected.

4. The method as set forth in claim 3 wherein the refrigeration circuit is reversible for supplying heating and cooling and wherein the thermostat outputs include a first output for indicating a need for operation of the compressor of the refrigeration circuit, a second output for indicating a need to switch a reversing valve in the refrigeration circuit to the cooling mode of operation, a third output for indicating a need for an indoor fan to be operated and a fourth output for indicating a second stage heating need and wherein the step of determining which outputs are energized arranges the outputs in a known binary sequence and converts them to a usable format and wherein the step of comparing includes a legal list of outputs in the same format.

5. The method as set forth in claim 4 wherein the air conditioning system includes a microprocessor and wherein the step of determining is accomplished by the microprocessor converting the outputs into a binary format and wherein the step of comparing ascertains whether the binary array derived from the step of determining is a known legal array.

6. Apparatus for determining if a thermostat assembly associated with an air conditioning system is appropriately energizing the outputs from the thermostat in known patterns which comprises:
   means for determining which outputs of the thermostat are energized;
   means for storing the outputs determined in an array having a predetermined order;
   means for comparing the output array generated with known legal outputs; and
   means for indicating a fault condition if the means for comparing ascertains the output array is not a legal array.

7. The apparatus as set forth in claim 6 wherein the means for indicating is a light mounted to the thermostat which may be energized to indicate the fault.

8. The apparatus as set forth in claim 7 wherein the means for comparing the output array to known legal outputs is a programmed microprocessor.

9. The apparatus as set forth in claim 6 wherein the air conditioning system includes a reversible refrigeration circuit having a compressor and a reversing valve, an indoor fan for circulating air and secondary heating means and wherein the thermostat generates a first output to indicate a need for operating the refrigeration circuit, a second output for indicating a need to switch the reversing valve in the refrigeration circuit to the cooling mode of operation, a third output for indicating a need for indoor fan operation and a fourth output for indicating a second stage heating need to operate the secondary heating means and wherein the means for comparing further comprises:
   means for determining if the fourth output is energized, and if so, means for then ascertaining if the first and third outputs are energized and the second output not energized; and
   wherein the means for indicating a fault condition so indicates if the fourth output is energized and if either the first or third outputs is not energized or if the second output is energized.

10. The apparatus as set forth in claim 9 wherein the means for comparing further comprises:
   means for ascertaining that the third and fourth outputs are not energized and that either the first output alone or the first and second outputs are energized; and
   wherein the means for indicating a fault so indicate in response to the means for ascertaining.

* * * * *